United States Patent
Reddy et al.

(10) Patent No.: US 9,783,724 B2
(45) Date of Patent: Oct. 10, 2017

(54) GELLABLE TREATMENT FLUIDS COMPRISING QUATERNARY AMMONIUM SALT GEL-TIME MODIFIERS AND METHODS FOR USE THEREOF

(71) Applicant: Halliburton Energy Services, Inc., Houston, TX (US)

(72) Inventors: B. Raghava Reddy, The Woodlands, TX (US); Larry S. Eoff, Porter, TX (US)

(73) Assignee: Halliburton Energy Services, Inc., Houston, TX (US)

(*) Notice: Subject to any disclaimer, the term of this patent is extended or adjusted under 35 U.S.C. 154(b) by 45 days.

(21) Appl. No.: 14/833,514

(22) Filed: Aug. 24, 2015

(65) Prior Publication Data
US 2015/0361321 A1   Dec. 17, 2015

Related U.S. Application Data

(62) Division of application No. 13/171,677, filed on Jun. 29, 2011, now Pat. No. 9,150,781.

(51) Int. Cl.
| | |
|---|---|
| *C09K 8/12* | (2006.01) |
| *C09K 8/588* | (2006.01) |
| *C09K 8/52* | (2006.01) |
| *C09K 8/88* | (2006.01) |
| *C09K 8/68* | (2006.01) |
| *C09K 8/035* | (2006.01) |
| *C09K 8/512* | (2006.01) |

(52) U.S. Cl.
CPC ............ *C09K 8/12* (2013.01); *C09K 8/035* (2013.01); *C09K 8/512* (2013.01); *C09K 8/52* (2013.01); *C09K 8/588* (2013.01); *C09K 8/685* (2013.01); *C09K 8/882* (2013.01); *C09K 8/887* (2013.01)

(58) Field of Classification Search
None
See application file for complete search history.

(56) References Cited

U.S. PATENT DOCUMENTS

| | | |
|---|---|---|
| 4,613,631 A | 9/1986 | Espenscheid et al. |
| 4,842,073 A | 6/1989 | Himes et al. |
| 4,974,678 A | 12/1990 | Himes et al. |
| 4,975,208 A | 12/1990 | Watkins |

(Continued)

FOREIGN PATENT DOCUMENTS

| | | |
|---|---|---|
| CA | 2091489 A1 | 10/1993 |
| CA | 2779027 A1 | 12/2012 |

(Continued)

OTHER PUBLICATIONS

Examination Report received in corresponding Mexican Application No. MX/a/2012/007547, dated Sep. 12, 2016.

*Primary Examiner* — John J Figueroa
(74) *Attorney, Agent, or Firm* — McDermott Will & Emery LLP

(57) ABSTRACT

Methods for reducing the amount of water produced from a subterranean formation can include the use of a gellable treatment fluid that comprises a quaternary ammonium salt as a gel-time modifier. The gellable treatment fluids can comprise an aqueous base fluid, a base polymer comprising an acrylamide monomer unit, an organic crosslinking agent, and a gel-time modifier comprising a quaternary ammonium salt.

12 Claims, 2 Drawing Sheets

(56) References Cited

U.S. PATENT DOCUMENTS

| | | |
|---|---|---|
| 4,977,962 A | 12/1990 | Himes et al. |
| 5,007,481 A | 4/1991 | Williams et al. |
| 5,089,151 A | 2/1992 | Hall et al. |
| 5,181,568 A | 1/1993 | McKown et al. |
| 5,203,834 A | 4/1993 | Hutchins et al. |
| 5,339,269 A | 8/1994 | Takagi |
| 5,351,651 A | 10/1994 | Ushio et al. |
| 5,363,916 A * | 11/1994 | Himes .................. C09K 8/08 166/276 |
| 5,480,933 A | 1/1996 | Fox et al. |
| 5,617,920 A | 4/1997 | Dovan et al. |
| 5,836,392 A | 11/1998 | Urlwin-Smith |
| 5,905,100 A | 5/1999 | Moradi-Araghi |
| 6,176,315 B1 | 1/2001 | Reddy et al. |
| 6,189,615 B1 | 2/2001 | Sydansk |
| 6,196,317 B1 | 3/2001 | Hardy |
| 6,547,871 B2 | 4/2003 | Chatterji et al. |
| 6,569,234 B2 | 5/2003 | Yamashita et al. |
| 6,607,035 B1 | 8/2003 | Reddy et al. |
| 6,764,981 B1 | 7/2004 | Eoff et al. |
| 6,936,574 B2 | 8/2005 | Dao et al. |
| 6,981,552 B2 | 1/2006 | Reddy et al. |
| 7,007,752 B2 | 3/2006 | Reddy et al. |
| 7,091,160 B2 | 8/2006 | Dao et al. |
| 7,128,148 B2 | 10/2006 | Eoff et al. |
| 7,159,659 B2 | 1/2007 | Welton et al. |
| 7,287,587 B2 | 10/2007 | Reddy et al. |
| 7,299,874 B2 | 11/2007 | Welton et al. |
| 7,303,019 B2 | 12/2007 | Welton et al. |
| 7,322,414 B2 | 1/2008 | Reddy et al. |
| 7,325,613 B2 | 2/2008 | Reddy et al. |
| 7,331,390 B2 | 2/2008 | Eoff et al. |
| 7,857,055 B2 | 12/2010 | Li |
| 8,322,421 B2 | 12/2012 | Reddy et al. |
| 8,522,874 B2 | 9/2013 | Reddy et al. |
| 9,090,811 B2 | 7/2015 | Reddy et al. |
| 9,150,781 B2 | 10/2015 | Reddy et al. |
| 2003/0000697 A1 | 1/2003 | Bayliss et al. |
| 2006/0183646 A1 | 8/2006 | Welton et al. |
| 2006/0234871 A1* | 10/2006 | Dalrymple ............. C09K 8/428 507/211 |
| 2006/0278390 A1 | 12/2006 | Reddy et al. |
| 2006/0289158 A1 | 12/2006 | Reddy et al. |
| 2007/0173413 A1 | 7/2007 | Lukocs et al. |
| 2008/0058229 A1 | 3/2008 | Berkland et al. |
| 2008/0280788 A1 | 11/2008 | Parris et al. |
| 2009/0145607 A1 | 6/2009 | Li |
| 2009/0149355 A1 | 6/2009 | Putzig |
| 2010/0048430 A1 | 2/2010 | Funkhouser et al. |
| 2011/0114318 A1 | 5/2011 | Ezell et al. |
| 2011/0214865 A1 | 9/2011 | Reddy et al. |
| 2011/0214866 A1 | 9/2011 | Reddy et al. |
| 2011/0214867 A1 | 9/2011 | Reddy et al. |
| 2012/0279708 A9 | 11/2012 | Reddy et al. |

FOREIGN PATENT DOCUMENTS

| | | |
|---|---|---|
| CA | 2779043 A1 | 12/2012 |
| EP | 1201874 A2 | 5/2002 |
| EP | 1369551 A1 | 12/2003 |
| WO | WO-95/00742 A1 | 1/1995 |
| WO | WO-2011/107743 A1 | 9/2011 |
| WO | WO-2011/107744 A1 | 9/2011 |

* cited by examiner

GELLABLE TREATMENT FLUIDS COMPRISING QUATERNARY AMMONIUM SALT GEL-TIME MODIFIERS AND METHODS FOR USE THEREOF

CROSS-REFERENCE TO RELATED APPLICATIONS

This application is a divisional of U.S. patent application Ser. No. 13/171,677, filed on Jun. 29, 2011.

BACKGROUND

The present invention relates to methods and compositions for reducing the amount of water produced from a subterranean formation, and, more specifically, to methods and compositions for treating at least a portion of a subterranean formation to reduce water permeability using a gellable treatment fluid that comprises a gel-time modifier comprising a quaternary ammonium salt.

Water often undesirably accompanies the production of oil and gas from a well penetrating a subterranean formation. The unwanted production of water from hydrocarbon-producing wells can constitute a considerable technical problem and expense in oilfield operations. If the ratio of produced-water to produced-oil and gas becomes sufficiently large, the cost of separating the water and disposing of it can become a barrier to continued production. This can lead to abandonment of a well penetrating a subterranean formation, even when significant amounts of hydrocarbons remain therein.

In a subterranean formation, water's high mobility often allows it to flow to or from a well bore by way of natural and manmade fractures, high permeability zones, and the like. In such cases, less permeable zones in the formation can be bypassed. The bypassing of less permeable zones can be especially problematic when an aqueous treatment fluid is introduced into a subterranean formation. For example, in enhanced oil recovery techniques, an aqueous fluid can be introduced into a subterranean formation during water flooding operations. When less permeable zones are present in the subterranean formation, lower oil and gas production can occur due to a less effective water flooding operation being realized. The presence of natural and manmade fractures, high permeability zones and the like also poses problems when aqueous fluids need to be introduced into low permeability zones for purposes other than flooding operations. Examples can include acid stimulation treatments and near-wellbore cleanup fluids. In such cases, aqueous fluids can preferentially enter high permeability zones and bypass low permeability zones, which are the intended targets of fluid treatments.

One way in which the foregoing problems can be addressed is through conformance control treatments, whereby high permeability zones become fully or partially blocked to fluid flow. In the case of unwanted water production, full blockage of water producing permeable zones, regardless of high or low permeability, can stop the unwanted production of water. In the case of flooding operations, partial blocking of high permeability zones can enable oil production from bypassed low permeability zones. In the case of stimulation and near wellbore cleanup, partial blocking of high permeability zones can allow diversion of a stimulation fluid (e.g., an acid) or well cleanup fluid to a low permeability zone.

Conformance control treatments can involve introducing gellable polymer systems into a subterranean formation via an aqueous treatment fluid. The gellable polymer systems can form a gel through crosslinking a water-soluble polymer using a crosslinking agent. The gel-time and the gel strength of the gellable polymer systems are among the factors that can determine the effectiveness of a conformance control treatment. For example, if the gel-time is too short, introduction or placement of the gellable polymer system into a subterranean formation can prove problematic. Conversely, if the gel-time is too long, the gellable polymer system may not form a gel in the desired portion of the subterranean formation, or long waiting periods may be required before further operations can be carried out.

A number of crosslinking agents can be used to crosslink water-soluble polymers in gellable polymer systems. Chromium and other transition metal ions can be used to crosslink acrylamide-containing polymers and copolymers. Generally, gels formed using such crosslinking agents have proven unsuitable at higher temperatures (e.g., above about 80° C.) due to uncontrolled crosslinking rates (e.g., short gel-times), crosslinking agent precipitation, polymer degradation, and the like. In addition, chromium and certain other transition metal ions can have an undesirable environmental impact. Acrylamide-containing polymers, copolymers, and partially hydrolyzed variants thereof can also be gelled with polyalkyleneimines and polyalkylenepolyamines. In such gellable polymer systems, the gel-times are often so short that the crosslinking agent and water-soluble polymer are generally pumped downhole separately in order to prevent premature gellation from occurring. Gel-time accelerators and gel-time retarders have also been used in the art to modify the gel-times in such systems.

Gellable polymer systems typically comprise a crosslinkable polymer and a crosslinking agent. Normally, as the concentration of either of these components decreases in a treatment fluid, the time required to form a gel as measured by an increase in viscosity of the treatment fluid at a given temperature, referred to herein as "gel-time," increases. Typically, the gel-time is determined by measuring the viscosity of a treatment fluid comprising the gellable polymer system as a function of time. Although treatment fluids having lower concentration gellable polymer systems are desirable from a cost-of-goods standpoint, increased gel-times at lower concentrations can make such treatment fluids ineffective for treating a subterranean formation.

The gel-time of a treatment fluid comprising a gellable polymer system is usually a function of temperature and the concentrations of water-soluble polymer and crosslinking agent therein. Generally, at higher concentrations of these components, shorter gel-times can result. Conversely, at lower concentrations, gel-times can be increased. In some instances, low concentration gellable polymer systems can have gel-times that are increased to such an extent that they can become ineffective for treating a subterranean formation. Furthermore, at lower concentrations, the gel strength can also be impacted to some degree. Although gel strength is not typically a concern in most conformance control treatment fluids due to relatively high concentrations of water-soluble polymer and crosslinking agent being used, it bears mentioning that gel strength can be reduced in low concentration gellable polymer systems.

In conformance control treatments using acrylamide-containing polymers and copolymers and crosslinking agents such as, for example, polyethyleneimine and polyalkylenepolyamines, relatively high concentrations of both components are typically used. From an economic standpoint alone, it would be desirable to reduce the amounts of either of these materials while still maintaining acceptable gel-times and gel strengths to achieve successful conformance control. For polyethyleneimine, in particular, it would also be desirable to reduce the amounts of this highly corrosive material being used in conformance control treatment fluids in order to improve their environmental rating.

SUMMARY OF THE INVENTION

The present invention relates to methods and compositions for reducing the amount of water produced from a subterranean formation, and, more specifically, to methods and compositions for treating at least a portion of a subterranean formation to reduce water permeability using a gellable treatment fluid that comprises a gel-time modifier comprising a quaternary ammonium salt.

In one embodiment, the present invention provides a method comprising: providing a gellable treatment fluid that comprises: an aqueous base fluid; a base polymer comprising an acrylamide monomer unit; an organic crosslinking agent; and a gel-time modifier comprising a quaternary ammonium salt; introducing the gellable treatment fluid into at least a portion of a subterranean formation; and allowing the gellable treatment fluid to form a gel in the subterranean formation.

In one embodiment, the present invention provides a method comprising: providing a gellable treatment fluid that comprises: an aqueous base fluid; a base polymer comprising an acrylamide monomer unit; an organic crosslinking agent comprising a polymer selected from the group consisting of polyethyleneimine, polyvinylamine, any derivative thereof, any salt thereof, and any combination thereof; and a gel-time modifier comprising a quaternary ammonium salt that comprises no alkyl groups that are larger than $C_4$ alkyl groups; and wherein the gellable treatment fluid has a reduced gel-time relative to a like gellable treatment fluid lacking the quaternary ammonium salt; introducing the gellable treatment fluid into at least a portion of a subterranean formation; and allowing the gellable treatment fluid to form a gel in the subterranean formation.

In one embodiment, the present invention provides a gellable treatment fluid comprising: an aqueous base fluid; a base polymer comprising an acrylamide monomer unit; an organic crosslinking agent comprising a polymer selected from the group consisting of polyethyleneimine, polyvinylamine, any derivative thereof, any salt thereof, and any combination thereof; and a gel-time modifier comprising a quaternary ammonium salt.

The features and advantages of the present invention will be readily apparent to one of ordinary skill in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will be evident to one having ordinary skill in the art and the benefit of this disclosure.

DETAILED DESCRIPTION

Figure 1:
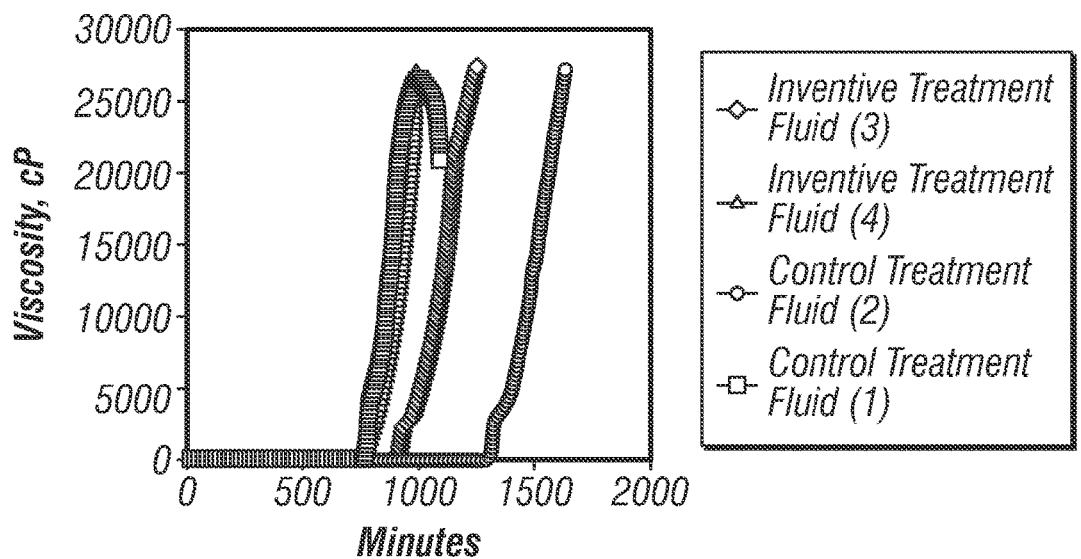
FIG. 1 shows an illustrative plot of viscosity as a function of time for various gellable treatment fluids comprising a t-butylacrylate/acrylamide base polymer and polyethyleneimine.

The present invention relates to methods and compositions for reducing the amount of water produced from a subterranean formation, and, more specifically, to methods and compositions for treating at least a portion of a subterranean formation to reduce water permeability using a gellable treatment fluid that comprises a gel-time modifier comprising a quaternary ammonium salt.

There are many advantages of the present invention. For instance, the present invention provides treatment fluid compositions and methods for use thereof in which gellable polymer systems are present in lower concentrations than are conventionally used in the art, while still providing gel-times that are of an effective length for suitable downhole placement and performance to be realized. As defined herein, a "treatment fluid" is a fluid that is placed in a subterranean formation in order to perform a desired function. Treatment fluids can be used in a variety of subterranean operations, including, but not limited to, drilling operations, production treatments, stimulation treatments, remedial treatments, fluid diversion operations, fracturing operations, secondary or tertiary EOR operations, and the like. As used herein, the terms "treatment" and "treating" refer to any subterranean operation that uses a fluid in conjunction with performing a desired function and/or achieving a desired purpose. The terms "treatment" and "treating," as used herein, do not imply any particular action by the fluid or any particular component thereof unless otherwise specified. Treatment fluids can include, for example, drilling fluids, fracturing fluids, acidizing fluids, conformance treatment fluids, damage control fluids, remediation fluids, scale removal and inhibition fluids, chemical floods, and the like.

According to the present embodiments, it has been surprisingly discovered that inclusion of the presently described gel-time modifiers can reduce the gel-time of a treatment fluid comprising a low concentration gellable polymer system to a level comparable to that of a like high concentration gellable polymer system. Specifically, in treatment fluids comprising a base polymer comprising an acrylamide monomer unit (e.g., polyacrylamide, acrylamide copolymers, and partially hydrolyzed versions thereof) and an organic crosslinking agent (e.g., polyethyleneimine and polyalkyleneamines), it has been surprisingly discovered that low concentrations of a quaternary ammonium salt can beneficially reduce the treatment fluids' gel-times. Other additives can also be used in combination with the quaternary ammonium salt, as discussed hereinafter, to further modify the gel-times.

It is particularly surprising that quaternary ammonium salts serve to reduce gel-times in the present treatment fluids, since it has been found in the art that simple inorganic ammonium salts (e.g., ammonium chloride) can actually increase gel-times in treatment fluids comprising like gellable polymer systems. Generally, treatment fluids comprising a gellable polymer system utilize an aqueous base fluid such as a brine or like salt solution (e.g., 2% aqueous KCl). As has been demonstrated in the art, replacement of some or all of the salt with ammonium chloride results in increased gel-times. The quaternary ammonium salts used in the present invention surprisingly have the opposite effect, as can be seen in the representative examples presented herein. That is, in the present treatment fluids, quaternary ammonium salts can reduce the gel-times. The level of gel-time reduction can be to such an extent that a treatment fluid having a low concentration gellable polymer system has at least a comparable gel-time to a treatment fluid comprising a high concentration gellable polymer system.

Concerns have recently been raised regarding the environmental impact of treatment fluids used for various subterranean operations. Since the treatment fluids of the present invention comprise a lower concentration of at least one of the components of the gellable polymer system than do conventional treatment fluids having comparable gel-times, the present treatment fluids can be particularly advantageous from an environmental standpoint. Particularly, in some embodiments, the present treatment fluids can comprise a lower concentration of crosslinking agent. In more specific embodiments, use of a quaternary ammonium salt in the present treatment fluids can allow lower concentrations of polyethyleneimine, which is highly corrosive, to be used in the treatment fluid.

Additionally, quaternary ammonium compounds can inhibit swelling of clays and shale zones when they are exposed to aqueous fluids (for example, see U.S. Pat. Nos. 4,842,073, 4,974,678, 4,977,962, and 5,089,151, each of which is incorporated herein by reference). In the absence of tetraalkylammonium compounds, it can be a common practice to add salts such as, for example, sodium chloride or potassium chloride to prevent swelling of clays and shaley zones. However, sodium chloride and potassium chloride are not generally as effective as tetraalkylammonium compounds in preventing clay swelling and maintaining subterranean formation permeability. Prevention of swelling in such zones can be important during drilling, as well as for injection of fluids into the matrix of the subterranean formation. Further, excessive addition of alkali metal salts for the purpose of preventing clay and shale swelling can unduly prolong the gel-times of the present treatment fluids. Thus, there is also a need to incorporate materials that prevent clay and shale swelling, while at the same time not prolonging the gel-times of the present compositions significantly.

Although the present disclosure primarily describes treatment fluids that can be used in conformance control operations, it is to be understood that the treatment fluids of the present invention can be used in any of the drilling stage, the production stage, the stimulation stage, enhanced oil recovery (EOR) operations, or the remediation stage of a subterranean operation. Any of these operations can benefit from the reduced amount of water produced from the subterranean formation or from decreased formation water permeability, for example.

Treatment fluids of the present invention generally comprise an aqueous base fluid as the continuous phase. Aqueous phase base fluids can include, for example, fresh water, acidified water, salt water, seawater, brine, or an aqueous salt solution. In some embodiments, the treatment fluids can also comprise small amounts of hydrocarbons such that the aqueous base fluid remains as the continuous phase. The small amounts of hydrocarbons can be introduced from any source. In one embodiment, introduction of small amounts of hydrocarbons in the present treatment fluids can take place concurrently with the components of the gellable polymer system, as some of these components may be obtained commercially in a hydrocarbon base fluid. It is not believed that small amounts of hydrocarbons, when present, significantly impact the treatment fluid's performance in forming a gel.

In various embodiments, treatment fluids of the present invention can include an aqueous base fluid as the continuous phase. In some embodiments, the aqueous base fluid can be an aqueous salt solution. Such aqueous salt solutions can have a salt concentration ranging between about 0.1% and about 10% by weight. The salt concentration can range between about 1% and about 10% by weight in some embodiments or between about 2% and about 5% by weight in other embodiments. In some embodiments, the quaternary ammonium salt can entirely comprise the salt of such aqueous salt solutions. In other embodiments, the salt of such aqueous salt solutions can comprise a mixture of the quaternary ammonium salt and an alkali metal or alkaline earth metal salt. Illustrative alkali metal salts include, for example, LiF, LiCl, LiBr, LiI, NaF, NaCl, NaBr, NaI, KF, KCl, KBr, KI, RbF, RbCl, RbBr, RbI, CsF, CsCl, CsBr, and CsI. Of these, sodium chloride and potassium chloride are presently preferred. Illustrative alkaline earth metal salts include, for example, $CaCl_2$, $CaBr_2$, $CaI_2$, $MgCl_2$, $MgBr_2$, $MgI_2$, $SrCl_2$, $SrBr_2$, $SrI_2$, $BaCl_2$, $BaBr_2$, and $BaI_2$. Other alkali metal or alkaline earth metal salts such as, for example, nitrates, acetates, and soluble formates can also be used for forming the aqueous salt solution. When used in combination with an alkali metal salt or an alkaline earth metal salt, the quaternary ammonium salt can be present in a ratio ranging between about 1:99 quaternary ammonium salt:alkali/alkaline earth metal salt to about 99:1 quaternary ammonium salt:alkali/alkaline earth metal salt. In some embodiments, there can be at most about 10% quaternary ammonium salt and not less than about 90% alkali/alkaline earth metal salt. In other embodiments, there can be at most about 20% quaternary ammonium salt and not less than about 80% alkali/alkaline earth metal salt, or at most about 30% quaternary ammonium salt and not less than about 70% alkali/alkaline earth metal salt, or at most about 40% quaternary ammonium salt and not less than about 60% alkali/alkaline earth metal salt, or at most about 50% quaternary ammonium salt and not less than about 50% alkali/alkaline earth metal salt, or at most about 60% quaternary ammonium salt and not less than about 40% alkali/alkaline earth metal salt, or at most about 70% quaternary ammonium salt and not less than about 30% alkali/alkaline earth metal salt, or at most about 80% quaternary ammonium salt and not less than about 20% alkali/alkaline earth metal salt, or at most about 90% quaternary ammonium salt and not less than about 10% alkali/alkaline earth metal salt. In general, it is preferred to use as low as possible a concentration of the quaternary ammonium salt that achieves a desired gel-time for a given subterranean operation. At least one of the reasons that it is preferable to use as low as possible a concentration of the quaternary ammonium salt is cost, as quaternary ammonium salts are somewhat more costly than are most alkali/alkaline earth metal salts.

In some embodiments, gellable treatment fluids of the present invention can comprise an aqueous base fluid, a base polymer that comprises an acrylamide monomer unit, an organic crosslinking agent, and a gel-time modifier that comprises a quaternary ammonium salt.

In various embodiments, the gellable treatment fluids can have a reduced gel-time relative to that of a like treatment fluid lacking the quaternary ammonium salt. As used herein, the term "like treatment fluid" refers to a second treatment fluid having substantially the same composition as that of a first treatment fluid, with the exceptions of: 1) the second treatment fluid having a different concentration of at least one component, and 2) the second treatment fluid lacking the gel-time modifier comprising a quaternary ammonium salt. Inert components that do not substantially affect the gel-time can also be present in a "like treatment fluid."

Quaternary ammonium salts used in the present treatment fluids are typically tetraalkylammonium salts. Illustrative tetraalkylammonium salts can include, without limitation, tetramethylammonium halides, tetraethylammonium halides, tetrapropylammonium halides, tetrabutylammonium halides, and the like. The alkyl groups in the quaternary ammonium salts can be either straight chain or branched. In some embodiments, the alkyl groups can be the same, and in other embodiments, they can be different. Some examples of tetraalkylammonium salts that comprise different alkyl groups are described in U.S. Pat. No. 4,842,073, which is incorporated herein by reference. In some embodiments, the treatment fluids of the present invention can comprise tetramethylammonium chloride as the quaternary ammonium salt. Longer alkyl chain (e.g., $>C_4$) quaternary ammonium salts can be cationic surfactants. However, without being bound by theory or mechanism of action, it is believed that the quaternary ammonium salts are not functioning in a surfactant role in the present embodiments. Although it is believed that quaternary ammonium salts having any carbon chain length can be used in the present embodiments, it is preferred that the quaternary ammonium salts comprise alkyl groups in which none of the alkyl groups are larger than $C_4$ alkyl groups. In alternative embodiments, however, quaternary ammonium salts that have at least one alkyl group that is larger than a $C_4$ alkyl group can also be used.

In some embodiments, the base polymers can be water-soluble. In some embodiments, the base polymers of the present treatment fluids can comprise an acrylamide monomer unit. Such base polymers can include, for example, polyacrylamide, acrylamide copolymers, and partially hydrolyzed versions thereof. In alternative embodiments, base polymers that comprise a methacrylamide monomer unit can be used. Examples of suitable (meth)acrylamide base polymers are described in U.S. Pat. No. 6,176,315 which is incorporated herein by reference in its entirety. Such base polymers can include, for example, water soluble polymethacrylamide, methacrylamide copolymers, and partially hydrolyzed variants thereof. Optionally, acrylamide and methacrylamide monomers can be used in combination with one another. In some embodiments, the base polymer can be a partially hydrolyzed polyacrylamide. Such a base polymer is available from Halliburton Energy Services of Duncan, Okla. under the tradename "FDP-835™," which has a molecular weight of about 640,000. In some embodiments, the base polymer can be a copolymer of acrylamide and an acrylate. In more specific embodiments, the base polymer can be a copolymer of acrylamide and t-butyl acrylate. Such a base polymer is available from Halliburton Energy Services of Duncan, Okla. under the tradename "HZ-10™," which has a molecular weight of about 107,000. In still other embodiments, the base polymer can be a copolymer of acrylamide and/or methacrylamide and monomers such as, for example, ethylene, propylene, styrene, maleic anhydride, and the like. Such polymers can also be partially hydrolyzed. In still other alternative embodiments, an acrylate ester monomer unit can replace acrylamide or methacrylamide or be used in combination with acrylamide or methacrylamide.

A portion of a base polymer comprising an acrylamide monomer unit is shown in Formula (1) below, where the wavy lines represent bonding to other monomer units.

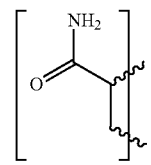

Formula (1)

In some embodiments, the base polymer can comprise an acrylate ester monomer unit. A portion of a base polymer comprising an acrylate ester monomer unit is shown in Formula (2) below, where the wavy lines represent bonding to other monomer units and R is an alkyl or aryl group, for example.

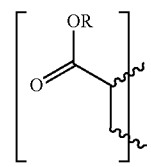

Formula (2)

In some embodiments, base polymers comprising acrylamide or acrylate ester monomer units can be at least partially hydrolyzed. As used herein, the term "at least partially hydrolyzed" refers to base polymers that have at least a portion of their side chain amide or ester groups hydrolyzed to form side chain acid groups. That is, base polymers that are partially hydrolyzed have at least some acrylic acid monomer units. In various embodiments, the degree of hydrolysis can range from about 0.1% to about 30% of the acrylamide/acrylate monomer units. A partial structure of a base polymer comprising acrylic acid monomer units is shown in Formula (3) below, where the wavy lines represent bonding to other monomer units (e.g., other acrylic acid monomer units and/or other acrylamide or acrylate ester monomer units).

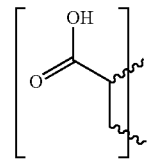

Depending on the pH of the treatment fluid, base polymers that are at least partially hydrolyzed can have their acidic side chains protonated (i.e., acidic) or deprotonated (i.e., anionic form). In various embodiments, the base polymers of the present invention can have a molecular weight ranging between about 100,000 and about 20,000,000.

Among other factors, the performance of the preceding base polymers can be impacted by the temperature at which they are allowed to gel. That is, the gel-times of the base polymers can vary depending on the temperature of the subterranean formation to which they are introduced. For example, a base polymer that produces an acceptable gel-time at lower temperatures can gel at an unacceptably fast rate at higher temperatures. Conversely, a base polymer that gels at an acceptable rate at higher temperature may not gel at an acceptable rate, if at all, at lower temperatures. For conformance control treatments using the specific base polymers set forth above in combination with polyethyleneimine as an organic crosslinking agent, an acrylamide/t-butyl acrylate copolymer is typically used when the temperature of the subterranean formation is about 160° F. or higher, whereas a partially hydrolyzed polyacrylamide is typically used when the subterranean formation has a temperature ranging between about 60° F. and about 160° F. It is to be noted that these preferred operating temperature ranges are for gellable treatment fluids that lack a quaternary ammonium salt. Use of a quaternary ammonium salt as a gel-time modifier in the present embodiments can allow an expanded effective operating temperature range of the base polymer. Accordingly, the present treatment fluids can be effectively used at temperatures lower than those conventionally used in the art, particularly those treatment fluids that comprise an acrylamide/t-butyl acrylate copolymer.

In some embodiments, the base polymers of the present invention are not hydrophobically modified. As used herein, the term "not hydrophobically modified" refers to a base polymer that does not comprise a hydrophobic modification thereon. As used herein, a hydrophobic modification of a base polymer will be considered to be any hydrophobic group having more than about 4 carbon atoms. More particularly, in some embodiments, the base polymers of the present invention lack monomer units having a quaternized nitrogen atom and a hydrophobic modification thereon.

Particularly suitable organic crosslinking agents that can be used with the above base polymers are themselves crosslinkable polymers. In some embodiments, suitable crosslinkable polymers include, for example, polyalkyleneimines and polyalkylenepolyamines, any derivative thereof, any salt thereof, and any combination thereof. In more specific embodiments, suitable crosslinkable polymers include, for example, polyethyleneimine, polyvinylamine (polyethylenepolyamine), any derivative thereof, any salt thereof, and any combination thereof. In alternative embodiments, suitable crosslinkable polymers can include polypropyleneimine, polypropylenepolyamine, polyallylamine, any derivative thereof, any salt thereof, and any combination thereof. In yet other alternative embodiments, the organic crosslinking agent can be chitosan, polymyxins, polylysine, any derivative thereof, any salt thereof, and any combination thereof.

It is to be noted that the gel-times of the present treatment fluids can also be a function of the amount of quaternary ammonium salt used. Generally, it is believed that higher concentrations of inorganic salts can lead to longer gel-times. However, it has been surprisingly discovered that quaternary ammonium salts can have the opposite effect. Quaternary ammonium salts are particularly useful in this regard, since they can be used at lower concentrations than purely inorganic salts to achieve a comparable gel-time. Further, they can be used in smaller quantities compared to inorganic salts to prevent swelling of clays and shales without unduly extending gel-times. In some embodiments, a concentration of the quaternary ammonium salt in the gellable treatment fluid can be sufficient to allow a reduced concentration of at least one of the base polymer or the organic crosslinking agent to be used in the gellable treatment fluid, while maintaining a shorter or substantially identical gel-time as a gellable treatment fluid lacking the quaternary ammonium salt and having a higher concentration of at least one of the base polymer or the organic crosslinking agent.

Generally, the base polymer, the organic crosslinking agent, and the quaternary ammonium salt are used together in concentrations that are appropriate to achieve a desired gel-time for a given application. Given the benefit of the present disclosure, one of ordinary skill in the art will be able to determine appropriate concentrations of the base polymer, the organic crosslinking agent, and the quaternary ammonium salt through routine experimentation. In various embodiments, the gellable treatment fluids of the present invention have reduced gel-times relative to a like gellable treatment fluid that lacks the quaternary ammonium salt. Appropriate concentrations of the quaternary ammonium salt have been set forth above. Generally, the concentration of the base polymer is about 10% or less by weight in a treatment fluid lacking the quaternary ammonium salt. Likewise, the concentration of the organic crosslinking agent is typically about 5% or less by weight in a treatment fluid lacking the quaternary ammonium salt. In some embodiments, for a given gel-time, the presence of the quaternary ammonium salt, optionally in combination with another gel-time modifier, can allow the concentration of at least one of the base polymer or the organic crosslinking agent to be reduced by at least about 25%, while maintaining a comparable gel-time to a like treatment fluid having a higher concentration of the base polymer and/or the organic crosslinking agent but lacking the quaternary ammonium salt. As used herein, a gel-time will be considered comparable to another gel-time if the variance is at most about 20%. In other embodiments, for a given gel-time, the presence of the quaternary ammonium salt, optionally in combination with another gel-time modifier, can allow the concentration of at least one of the base polymer or the organic crosslinking agent to be reduced by at least about 50%. In still other embodiments, for a given gel-time, the presence of the quaternary ammonium salt, optionally in combination with another gel-time modifier, can allow the concentration of at least one of the base polymer or the organic crosslinking agent to be reduced by at least about 75%.

In some embodiments, the base polymer and the organic crosslinking agent can be present at a ratio of up to about 50:1 base polymer:organic crosslinking agent. In other embodiments, the ratio of base polymer:organic crosslinking agent can be at most about 20:1. In still other embodiments, the ratio of base polymer:organic crosslinking agent can be at most about 10:1. As will be evident to one having ordinary skill in the art, when the amount of base polymer is reduced in the present treatment fluids with the amount of organic crosslinking agent remaining the same as a like treatment fluid lacking the quaternary ammonium salt, the ratio of these two components will be lower than that of a like treatment fluid of higher concentration lacking the quaternary ammonium salt. Likewise, when the amount of organic crosslinking agent is reduced in the present treatment fluids with the amount of base polymer remaining the same as in a like treatment fluid lacking the quaternary ammonium salt, the ratio of the two components will be higher. When the amount of both the base polymer and the organic crosslinking agent are lowered, the ratio of these two components can be lower, higher, or the same, depending upon how much the quantity of each component is lowered relative to the other.

In some embodiments, the present treatment fluids can further comprise at least one additional gel-time modifier in supplement to the quaternary ammonium salt. Such additional gel-time modifiers can be gel-time accelerators in some embodiments or gel-time retarders in other embodiments, depending on whether one wants to increase or decrease the gel-time in a particular treatment fluid. Illustrative gel-time modifiers can include, for example, pH modifying agents such as, for example, inorganic acids, organic acids, organic salts, and inorganic salts. Examples of such gel-time modifiers are set forth in U.S. Pat. Nos. 7,331,390, 7,325,613, 7,322,414, and 7,287,587, and co-pending U.S. patent application Ser. Nos. 12/716,951, 12/716,979 and 12/717,004, all filed on Mar. 3, 2010. Specific illustrative examples of pH modifying agents can include, for example, alkali metal carbonates, bicarbonates, acetates, formates, and hydroxides; organic acids (e.g., phenols and acetic acid); mineral acids (e.g., hydrochloric acid); and Lewis acids (e.g., boric acid). Illustrative gel-time retarders that can be used in the present embodiments include, for example, transition metal salts that can coordinate the organic crosslinking agent and acid anhydrides that can at least partially acylate amino groups in the organic crosslinking agent. A suitable coordinated organic crosslinking agent is described in commonly owned U.S. Pat. No. 6,196,317, which is incorporated herein by reference in its entirety. The use of acid anhydrides as a gel-time retarder is described in commonly owned U.S. Pat. No. 7,091,160, which is incorporated herein by reference in its entirety. When a gel-time retarder is used, the coordination bond strength or the degree of acylation can help control the gel-time.

In some embodiments, the at least one additional gel-time modifier can be compounds other than those described above that have been conventionally used in the art. For example, in some embodiments, the at least one additional gel-time modifier can be an amino alcohol, an oligomeric polyamine having a molecular weight of less than about 400, any salt thereof, any derivative thereof, and any combination thereof. Use of the preceding compounds as gel-time modifiers is described in commonly owned United States Patent Application Publication 2013/0000905 entitled "Gellable Treatment Fluids Comprising Amino Group Gel-Time Modifiers and Methods for Use Thereof" filed on Jun. 29, 2011 concurrently herewith), which is incorporated herein by reference in its entirety. In particular, this related application demonstrates that, in some embodiments, amino alcohols and oligomeric polyamines having a molecular weight of less than about 400 can have beneficially decreased gel-times like those seen using quaternary ammonium salts in the present embodiments. However, in other embodiments, higher concentrations of amino alcohols and oligomeric polyamines can have the opposite effect and produce increased gel-times. Thus, by choosing an appropriate concentration of the additional gel-time modifier, the gel-times can be increased or decreased as appropriate for treating a given subterranean formation. Specific examples of amino alcohols can include, for example, ethanolamine, diethanolamine, triethanolamine, propanolamine, salts thereof, derivatives thereof, and combinations thereof. Specific examples of oligomeric polyamines can include, for example, diethylenetriamine, triethylenetetraamine, tetraethylenepentaamine, salts thereof, derivatives thereof, and combinations thereof. It is particularly surprising that amino alcohols and low molecular weight polyamines (e.g., molecular weight of less than about 400) can promote gelation, since they have considerably fewer amino groups than the organic crosslinking agents of the present embodiments and would accordingly be anticipated to crosslink to a lesser degree as a result.

In some embodiments, treatment fluids of the present invention can further comprise at least one surfactant. Such surfactants include cationic surfactants, anionic surfactants, zwitterionic surfactants, and non-ionic surfactants, numerous examples of each of which are known to one having ordinary skill in the art. When present, a surfactant can be used in the present treatment fluids at a concentration ranging between about 0.1% and about 2.0% by weight or between about 0.5% and about 1.0% by weight in various embodiments.

Illustrative examples of surfactants can include, without limitation, ethoxylated nonyl phenol phosphate esters, alkyl phosphonates, linear alcohols, nonylphenol compounds, alkoxylated fatty acids, alkylphenol alkoxylates, ethoxylated amides, ethoxylated alkyl amines, betaines, methyl ester sulfonates (e.g., as described in commonly owned U.S. Pat. Nos. 7,159,659; 7,299,874; and 7,303,019 and U.S. patent application Ser. No. 11/058,611, filed Feb. 2, 2005 (now available as United States Patent Application Publication 2006/0183646), the entire disclosures of which are incorporated herein by reference), hydrolyzed keratin (e.g., as described in commonly owned U.S. Pat. No. 6,547,871, the entire disclosure of which is incorporated herein by reference), sulfosuccinates, taurates, amine oxides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), modified betaines, alkylamidobetaines (e.g., cocoamidopropyl betaine) and quaternary ammonium compounds (e.g., trimethyltallowammonium chloride, trimethylcocoammonium chloride). Suitable surfactants can be used in a liquid or powder form.

Further, the present treatment fluids can optionally comprise any number of additional additives commonly used in treatment fluids including, for example, anti-oxidants, polymer degradation prevention additives, relative permeability modifiers, scale inhibitors, corrosion inhibitors, foaming agents, defoaming agents, antifoam agents, emulsifying agents, de-emulsifying agents, iron control agents, proppants or other particulates, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), lubricants, breakers, friction reducers, bridging agents, viscosifiers, weighting agents, solubilizers, pH control agents (e.g., buffers), hydrate inhibitors, consolidating agents, bactericides, and the like. Combinations of these additives can be used as well.

In some embodiments, the gellable treatment fluids described herein can be used for treating at least a portion of a subterranean formation. In some embodiments, such treatments can involve reducing an amount of water produced from the portion of the subterranean formation. In some embodiments, such treatments can result in partial or complete reduction in permeability of the subterranean formation to water.

In some embodiments, methods of the present invention can comprise providing a gellable treatment fluid that comprises an aqueous base fluid, a base polymer that comprises an acrylamide monomer unit, an organic crosslinking agent, and a gel-time modifier that comprises a quaternary ammonium salt; introducing the gellable treatment fluid into at least a portion of a subterranean formation, and allowing the gellable treatment fluid to form a gel in the subterranean formation.

In some embodiments, methods of the present invention can comprise providing a gellable treatment fluid that comprises an aqueous base fluid, a base polymer comprising an acrylamide monomer unit, an organic crosslinking agent selected from polyethyleneimine, polyvinylamine, any derivative thereof, any salt thereof, and any combination thereof, and a gel-time modifier that comprises a quaternary ammonium salt that comprises no alkyl groups that are larger than $C_4$ alkyl groups; introducing the gellable treatment fluid into at least a portion of a subterranean formation; and allowing the gellable treatment fluid to form a gel in the subterranean formation. In such embodiments, the gellable treatment fluid has a reduced gel-time relative to a like gellable treatment fluid lacking the quaternary ammonium salt.

To facilitate a better understanding of the present invention, the following examples of preferred embodiments are given. In no way should the following examples be read to limit, or to define, the scope of the invention.

EXAMPLES

Example 1: Gel-Times in Gellable Treatment Fluids Comprising a t-Butylacrylate/Acrylamide Base Polymer and Polyethyleneimine Control Gellable Treatment fluids were prepared at the following compositions: (1) 350 gal/Mgal "HZ-10" and 30 gal/Mgal "HZ-20" in a 2% aqueous KCl base fluid, and (2) 175 gal/Mgal "HZ-10" and 30 gal/Mgal ("HZ-20" in a 2% aqueous KCl base fluid. Inventive treatment fluids were prepared at the following compositions: (3) 175 gal/Mgal "HZ-10" and 30 gal/Mgal "HZ-20" in 2% aqueous tetramethylammonium chloride, and (4) 175 gal/Mgal "HZ-10" and 30 gal/Mgal "HZ-20" in 2% aqueous tetramethylammonium chloride also comprising 0.5% ethanolamine. "HZ-10" is a t-butylacrylate/acrylamide copolymer that is available from Halliburton Energy Services of Duncan, Okla. "HZ-20" is a polyethyleneimine polymer that is available from Halliburton Energy Services of Duncan, Okla. The source of tetramethylammonium chloride was "CLAY FIX II"), which is available from Halliburton Energy Services of Duncan, Okla.

The viscosities of the above treatment fluids were measured as a function of time in order to determine their gel-times. Viscosity measurements were made at 160° F. FIG. 1 shows an illustrative plot of viscosity as a function of time for various gellable treatment fluids comprising a t-butylacrylate/acrylamide base polymer and polyethyleneimine. As shown in FIG. 1, control treatment fluid (1) had a gel-time of approximately 750 minutes. When the base polymer concentration was halved in control treatment fluid (2), the gel-time increased to approximately 1300 minutes. In contrast, when the 2% aqueous KCl base fluid of control treatment fluid (2) was replaced with 2% aqueous tetramethylammonium chloride, the gel-time decreased to about 900 minutes in inventive treatment fluid (3). A further decrease in gel-time was realized in inventive treatment fluid (4) upon incorporation of 0.5% ethanolamine in the base fluid. In the case of inventive treatment fluid (4), the gel-time was approximately 750 minutes, which is comparable to that of the original control treatment fluid (1). However, inventive treatment fluid (4) achieved this gel-time with only half the original amount of base polymer.

Example 2: Gel-times in Gellable Treatment Fluids Comprising a Partially Hydrolyzed Polyacrylamide Base Polymer and Polyethyleneimine A control gellable treatment fluid was prepared at the following composition: (5) 175 gal/Mgal "FDP-835™" and 30 gal/Mgal "HZ-20™" in a 2% aqueous KCl base fluid. Inventive treatment fluids were prepared at the following compositions: (6) 175 gal/Mgal "FDP-835™" and 30 gal/Mgal "HZ-20™" in 2% aqueous tetramethylammonium chloride, and (7) 175 gal/Mgal "FDP-835™" and 15 gal/Mgal "HZ-20™" in 2% aqueous tetramethylammonium chloride. "FDP-835™" is a partially hydrolyzed polyacrylamide that is available from Halliburton Energy Services of Duncan, Okla. The source of tetramethylammonium chloride was "CLAY FIX II™."

Figure 2:
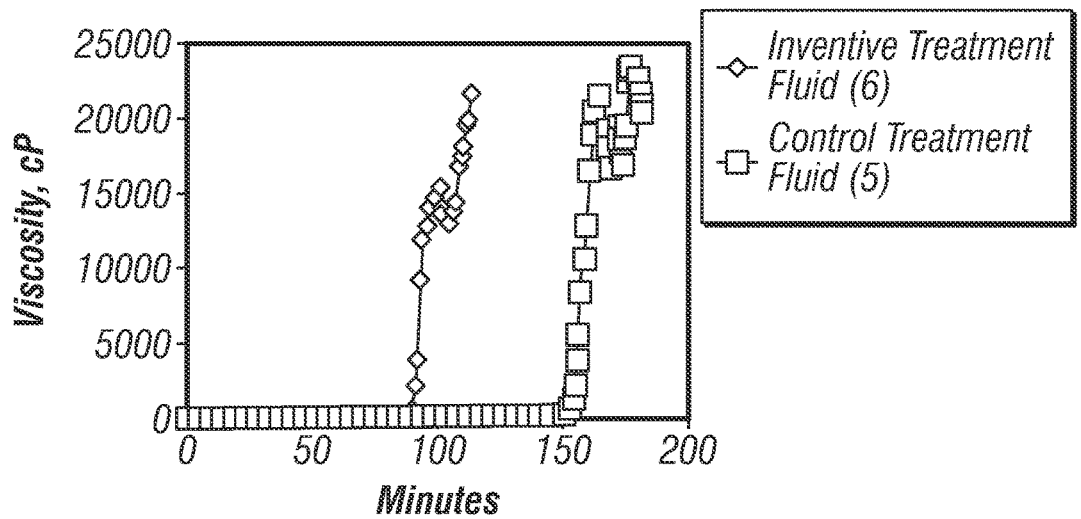
FIG. 2 shows an illustrative plot of viscosity as a function of time for various gellable treatment fluids comprising a partially hydrolyzed polyacrylamide base polymer and polyethyleneimine.
Figure 3:
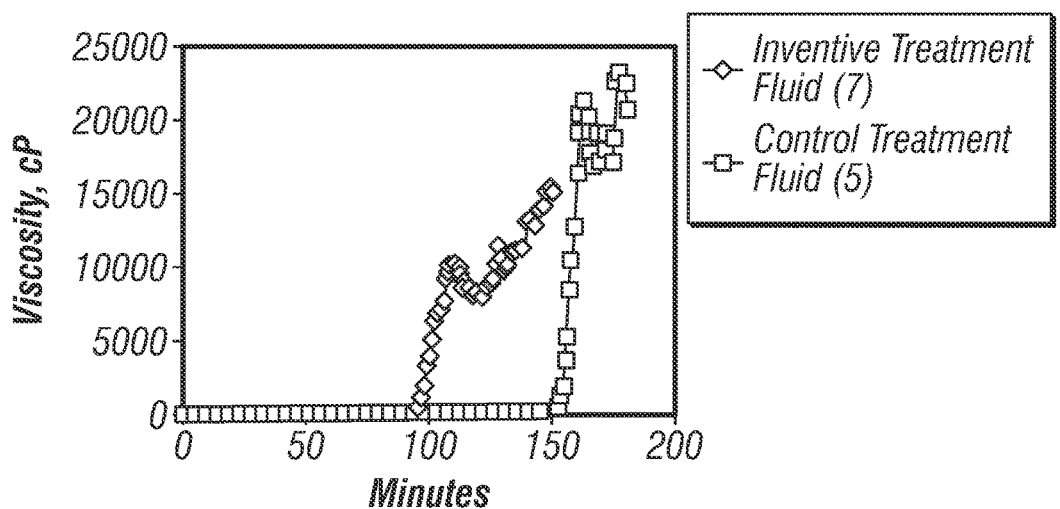
FIG. 3 shows an illustrative plot of viscosity as a function of time for various gellable treatment fluids comprising a partially hydrolyzed polyacrylamide base polymer and polyethyleneimine.

The viscosities of the above treatment fluids were measured as a function of time in order to determine their gel-times. Viscosity measurements were made at 160° F. FIGS. 2 and 3 show illustrative plots of viscosity as a function of time for various gellable treatment fluids comprising a partially hydrolyzed polyacrylamide base polymer and polyethyleneimine. As shown in FIG. 2, control treatment fluid (5) had a gel-time of approximately 150 minutes. When the same concentrations of base polymer and polyethyleneimine were gelled in the presence of 2% tetramethylammonium chloride in inventive treatment fluid (6), the gel-time decreased to approximately 90 minutes. Likewise, as shown in FIG. 3 for inventive treatment fluid (7), when the amount of polyethyleneimine was halved relative to control treatment fluid (5) and inventive treatment fluid (6), the gel-time was shorter than that of control treatment fluid (5) and essentially unchanged from that of inventive treatment fluid (6). It should be noted that although the gel-times were essentially the same in inventive treatment fluids (6) and (7), the viscosity of gelled treatment fluid (7) was lower than that of gelled treatment fluid (6). That is, a weaker gel was produced in the latter case.

Figure 4:
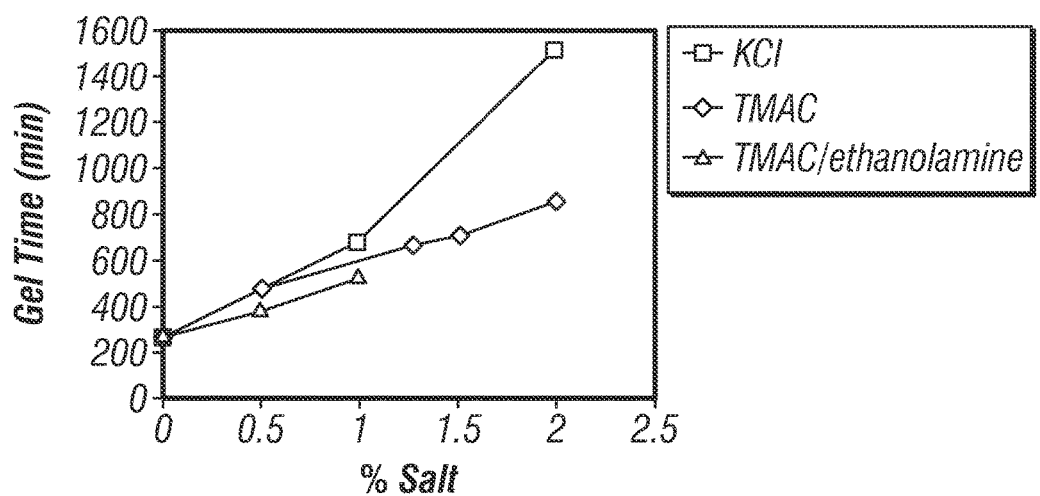
FIG. 4 shows an illustrative plot comparing the gel-times of gellable treatment fluids comprising KCl, tetramethylammonium chloride and tetramethylammonium chloride/ethanolamine as a function of concentration.

Example 3: Comparison of Gel-time Modification Ability of Inorganic Salts, Tetraalkylammonium Salts and Amine-Containing Compounds in Gellable Treatment Fluids Comprising a t-Butylacrylate/Acrylamide Base Polymer and Polyethyleneimine A gellable treatment fluid comprising 175 gal/Mgal "HZ-10™" and 30 gal/Mgal "HZ-20™" was prepared and differing amounts of KCl, tetramethylammonium chloride, and tetramethylammonium chloride comprising a fixed amount (0.82%) of ethanolamine were separately added. The gel times were measured at 160° F. FIG. 4 shows an illustrative plot comparing the gel-times of gellable treatment fluids comprising KCl, tetramethylammonium chloride and tetramethylammonium chloride/ethanolamine as a function of concentration. FIG. 4 shows the following results: 1) For a given weight percent of salt, tetramethylammonium chloride provided a shorter gel-time compared to the same amount of KCl. 2) Increased amounts of tetramethylammonium chloride increased the gel-time, although to significantly lesser extent than KCl. 3) Using a combination of tetramethylammonium chloride and ethanolamine produced a further reduction in gel-times. Ordinarily, such a reduction in gel-time could not have been achieved except by increasing the crosslinker concentration, the total polymer concentration or decreasing the salt concentration. The former options are considered to be uneconomical by today's standards. The latter option can lead to clay/shale swelling, which can decrease the permeability of a subterranean formation and increase the difficulty of injecting a gellable treatment fluid into the subterranean formation.

Therefore, the present invention is well adapted to attain the ends and advantages mentioned as well as those that are inherent therein. The particular embodiments disclosed above are illustrative only, as the present invention may be modified and practiced in different but equivalent manners apparent to one of ordinary skill in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is the following:

1. A gellable treatment fluid comprising:
   an aqueous base fluid;
   a base polymer comprising an acrylamide monomer unit;
   a crosslinking agent; and
   a gel-time modifier comprising a quaternary ammonium salt,
   wherein the quaternary ammonium salt decreases a gel-time of the gellable treatment fluid.

2. The gellable treatment fluid of claim 1, wherein the quaternary ammonium salt comprises no alkyl groups that are larger than $C_4$ alkyl groups.

3. The gellable treatment fluid of claim 1, wherein the base polymer comprises a partially hydrolyzed polyacrylamide.

4. The gellable treatment fluid of claim 1, wherein the base polymer comprises a copolymer of acrylamide and t-butyl acrylate.

5. The gellable treatment fluid of claim 1, further comprising at least one additional gel-time modifier.

6. The gellable treatment fluid of claim 5, wherein the at least one additional gel-time modifier comprises a compound selected from the group consisting of amino alcohols, oligomeric polyamines having a molecular weight of less than about 400, any salt thereof, any derivative thereof, and any combination thereof.

7. The gellable treatment fluid of claim 1, wherein the crosslinking agent comprises an organic crosslinking agent.

8. The gellable treatment fluid of claim 7, wherein the organic crosslinking agent comprises a crosslinkable polymer.

9. The gellable treatment fluid of claim 8, wherein the crosslinkable polymer comprises a polymer selected from the group consisting of polyethyleneimine, polyvinylamine, any derivative thereof, any salt thereof, and any combination thereof.

10. The gellable treatment fluid of claim 1, wherein the aqueous base fluid comprises an alkali or alkaline earth metal salt and a total salt content ranging between about 0.1% and about 10% by weight of the treatment fluid, the quaternary ammonium salt comprising at least a portion of the salt content.

11. The gellable treatment fluid of claim 10, wherein the quaternary ammonium salt comprises tetramethylammonium chloride.

12. The gellable treatment fluid of claim 1, wherein the quaternary ammonium salt comprises tetramethylammonium chloride.

* * * * *